US010908361B2

(12) United States Patent
Fluegel et al.

(10) Patent No.: US 10,908,361 B2
(45) Date of Patent: Feb. 2, 2021

(54) CAPACITIVE POSITION SENSING FOR CAPACITIVE DRIVE MEMS DEVICES

(71) Applicant: APPLE INC., Cupertino, CA (US)

(72) Inventors: Sebastian Fluegel, Sunnyvale, CA (US); Andrew J. Sutton, Sunnyvale, CA (US); Bryce T Bradford, Cupertino, CA (US); Yuval Gerson, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 198 days.

(21) Appl. No.: 16/221,523

(22) Filed: Dec. 16, 2018

(65) Prior Publication Data

US 2019/0377136 A1 Dec. 12, 2019

Related U.S. Application Data

(60) Provisional application No. 62/681,112, filed on Jun. 6, 2018.

(51) Int. Cl.
*G02B 6/35* (2006.01)
*G02B 26/08* (2006.01)
*G01P 15/125* (2006.01)

(52) U.S. Cl.
CPC .......... *G02B 6/357* (2013.01); *G02B 6/3584* (2013.01); *G02B 26/0841* (2013.01); *G01P 15/125* (2013.01)

(58) Field of Classification Search
CPC ... G02B 6/357; G02B 6/3584; G02B 26/0841
See application file for complete search history.

(56) References Cited

U.S. PATENT DOCUMENTS 4,404,560 A 9/1983 Williams, Jr.
5,172,039 A 12/1992 Owens
(Continued)

FOREIGN PATENT DOCUMENTS

CN 1862312 A 11/2006
WO 2014016794 A1 1/2014

OTHER PUBLICATIONS

Hofmann et al., "MEMS scanning laser projection based on high-q vacuum packaged 2D-resonators", Moems and Miniaturized Systems X, Proceedings of SPIE, vol. 7930, No. 1, pp. 1-10, Feb. 10, 2011.

(Continued)

*Primary Examiner* — Sung H Pak
*Assistant Examiner* — Hoang Q Tran
(74) *Attorney, Agent, or Firm* — Kligler & Associates Patent Attorneys Ltd

(57) ABSTRACT

An apparatus for driving and position sensing in a comb-drive actuator includes a generator, a driver circuit, sensing circuitry, and signal processing circuitry. The generator is configured to apply a sensing-voltage to a first electrode of the comb-drive actuator. The driver circuit is configured to apply a drive-voltage to a second electrode of the comb-drive actuator, having an opposite polarity relative to the first electrode. The sensing circuitry is configured to measure at the second electrode a sensed-waveform resulting from the sensing-voltage applied to the first electrode. The signal processing circuitry is configured to estimate a position of the first electrode relative to the second electrode based on the sensed-waveform.

10 Claims, 2 Drawing Sheets

(56) References Cited

U.S. PATENT DOCUMENTS

| | | | |
|---|---|---|---|
| 5,998,906 A * | 12/1999 | Jerman | G02B 6/357 |
| | | | 310/309 |
| 6,154,013 A | 11/2000 | Caamaño | |
| 6,501,262 B1 | 12/2002 | Schneeberger et al. | |
| 6,536,280 B1 | 3/2003 | Carley | |
| 6,714,336 B2 | 3/2004 | Orcutt et al. | |
| 6,744,173 B2 | 6/2004 | Behin et al. | |
| 6,906,849 B1 | 6/2005 | Mi et al. | |
| 6,933,873 B1 | 8/2005 | Horsley et al. | |
| RE39,747 E | 7/2007 | Peltier et al. | |
| 8,553,308 B2 | 10/2013 | Goren et al. | |
| 9,703,096 B2 | 7/2017 | Shpunt et al. | |
| 9,784,558 B2 | 10/2017 | Erlich | |
| 2007/0143658 A1 | 6/2007 | Low et al. | |
| 2008/0075924 A1 | 3/2008 | Kouma et al. | |
| 2009/0018791 A1 | 1/2009 | Dejong et al. | |
| 2009/0245299 A1 | 10/2009 | Stern et al. | |
| 2011/0109951 A1 | 5/2011 | Goren et al. | |
| 2012/0206081 A1 | 8/2012 | Sun | |

OTHER PUBLICATIONS

CN Application # 201811338193.6 Office Action dated Jul. 3, 2020.

\* cited by examiner

CAPACITIVE POSITION SENSING FOR CAPACITIVE DRIVE MEMS DEVICES

CROSS-REFERENCE TO RELATED APPLICATIONS

This application claims the benefit of U.S. Provisional Patent Application 62/681,112, filed Jun. 6, 2018, whose disclosure is incorporated herein by reference.

FIELD OF THE INVENTION

The present invention relates generally to micro-electromechanical systems (MEMS), and particularly to position measurements of MEMS elements.

BACKGROUND OF THE INVENTION

Various designs have been proposed for sensing a deflection and/or position of MEMS devices. For example, U.S. Pat. No. 6,744,173 describes a multi-layer vertical comb-drive actuator that includes a first comb structure having a plurality of first comb fingers and a second comb structure having a plurality of second comb fingers, wherein the first and second comb fingers are substantially interdigitated. The first and second comb fingers may include two or more stacked conductive layers electrically isolated by air gap. An application of a voltage between the first and second comb fingers causes the second comb structure to move relative to the first comb structure. The present invention includes a 2D-gimble configuration to rotate a movable element along two axes. In an embodiment, a position sense element may be coupled to a feedback element that is coupled to a voltage source. The position sense element may apply a high frequency dither to either first or second comb fingers. The position sensor sense element may then sense a return signal at the comb fingers not driven. A phase difference between the dither signal and return signal determines the capacitance. Such capacitance can be correlated with the relative positions of the second and first comb drives to obtain a very precise position measurement.

As another example, U.S. Pat. No. 6,536,280 describes a method for electronically decreasing the sensitivity of MEMS device layers to vibrations, accelerations, or rotations. Electronic stiffening is achieved by using position sensing and force feedback at one or more points on the movable micromachined structure. Precise servo control of Z axis height makes it possible to dramatically decrease the spacing between the movable MEMS layer or layers and fixed electrodes, which can lead to a dramatic increase in sensitivity and/or actuation force. A capacitance between finger-shaped electrodes on the MEMS structure and the nearby stationary finger-shaped electrodes can be measured by observing either the current, voltage or charge induced on those conductors by a high frequency signal applied to the MEMS structure. This is typically done by using a charge sensing amplifier. In this way, the position of the MEMS structure can be measured, as the capacitance varies with the motion of the MEMS structure.

U.S. Pat. No. 9,784,558 describes a Mechanical apparatus that includes a base and a moving element, which is mounted to rotate about an axis relative to the base. A capacitive rotation sensor includes at least one first electrode disposed on the moving element in a location adjacent to the base and at least one second electrode dis-posed on the base in proximity to the at least one first electrode. A sensing circuit is coupled to sense a variable capacitance between the first and second electrodes.

U.S. Pat. No. 8,553,308 describes a method for monitoring movement of at least one moving mirror in a MEMS device comprising one or more moving mirrors, and wherein the monitoring is based upon capacitance changes over time in the MEMS device. The method comprises the steps of: if the at least one moving mirror is an in-plain mirror, then: a. providing DC voltage to the MEMS device in addition to a driving voltage required for the movement of that at least one moving mirror; b. measuring current proportional to capacitance changes associated with the movement of the at least one moving mirror; and c. monitoring the movement of the at least one moving mirror based on the measured current. If the at least one moving mirror is a staggered mirror, then: d. measuring a current associated with the movement of the at least one moving mirror; e. identifying a plurality of ripples associated with capacitance changes in the MEMS device over time, in the measured current; and f. monitoring the movement of the at least one moving mirror based on the identified plurality of ripples.

SUMMARY OF THE INVENTION

An embodiment of the present invention that is described herein provides an apparatus for driving and position sensing in a comb-drive actuator. The apparatus includes a generator, a driver circuit, sensing circuitry, and signal processing circuitry. The generator is configured to apply a sensing-voltage to a first electrode of the comb-drive actuator. The driver circuit is configured to apply a drive-voltage to a second electrode of the comb-drive actuator, having an opposite polarity relative to the first electrode. The sensing circuitry is configured to measure at the second electrode a sensed-waveform resulting from the sensing-voltage applied to the first electrode. The signal processing circuitry is configured to estimate a position of the first electrode relative to the second electrode based on the sensed-waveform.

In some embodiments, the sensed-waveform falls on a resistor connected in series to the second electrode.

In some embodiments, the sensed-waveform is measured by a circuit having an adaptive reference ground.

In an embodiment, the sensing-voltage comprises a sine waveform.

In some embodiments, the generator is configured to apply the sensing-voltage to a common first electrode of two or more comb-drive actuators. The driver circuit includes two or more driver circuits configured to apply respective drive-voltages to two or more respective second electrodes of the two or more comb-drive actuators. The sensing circuitry is configured to measure at the second electrodes respective sensed-waveforms resulting from the sensing-voltage applied to the common first electrode. The signal processing circuitry is configured to estimate positions of the first electrodes relative to the respective second electrodes based on the respectively sensed-waveforms.

There is additionally provided, in accordance with an embodiment of the present invention, a method for driving and position sensing in a comb-drive actuator, the method including applying a sensing-voltage to a first electrode of the comb-drive actuator. A drive-voltage is applied to a second electrode of the comb-drive actuator, having an opposite polarity relative to the first electrode. A sensed-waveform resulting from the sensing-voltage applied to the first electrode is measured at the second electrode. A position of the first electrode relative to the second electrode is estimated based on the sensed-waveform.

The present invention will be more fully understood from the following detailed description of the embodiments thereof, taken together with the drawings in which:

DETAILED DESCRIPTION OF EMBODIMENTS

Overview

Figure 1:
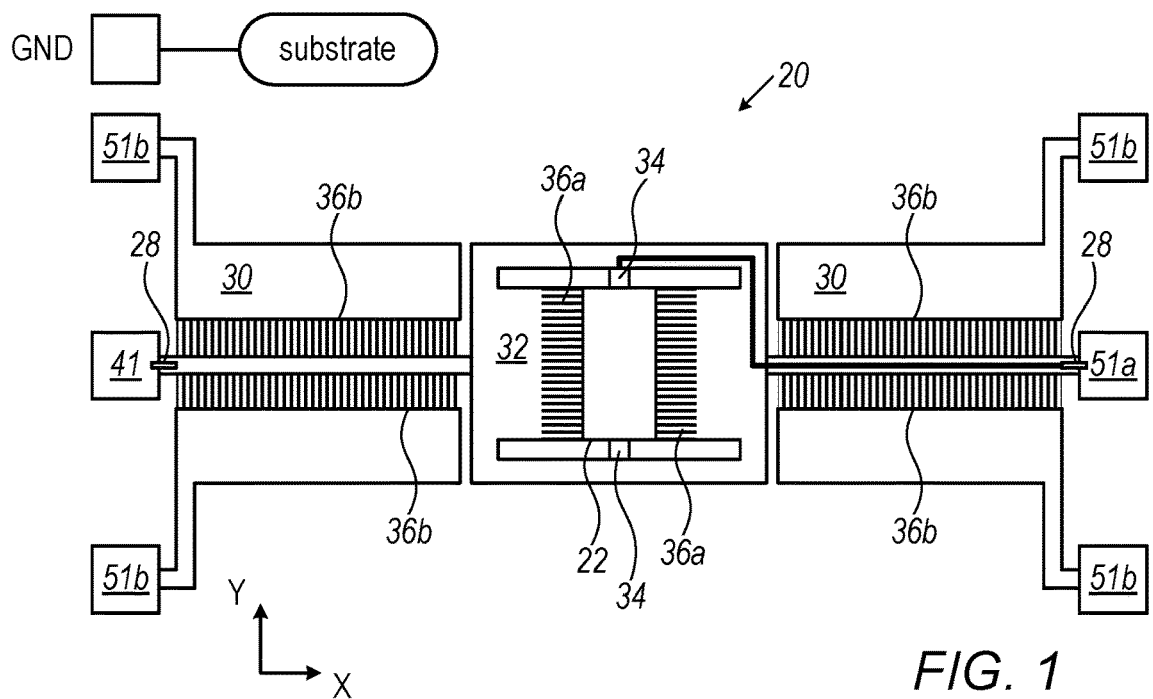
FIG. 1 is a schematic top view of a gimbaled micromirror array, in accordance with an embodiment of the present invention.

Embodiments of the present invention that are described hereinafter provide apparatus and methods for sensing positions of elements of MEMS devices, such as positions of MEMS mirrors. In some embodiments, a MEMS device comprises an actuator, which comprises a stator and a rotor. The stator and the rotor have interleaving combs, which form a capacitive link referred to herein as a "comb-drive actuator" or "variable-capacitor." Applying a high-voltage between the stator and the rotor generates an electrostatic force that causes the rotor of the comb-drive actuator to move. The applied high-voltage is referred to herein as "drive-voltage."

Changes in the extent of overlap between the stator comb and the rotor comb result in variation in the capacitance of the capacitive link (i.e., of the comb-drive actuator), with the maximum capacitance occurring at maximum overlap. This effect can be used to precisely measure a position of the comb-drive actuator. The capacitance value of the capacitive link can be measured by applying a high-frequency low-voltage waveform on one electrode of the variable-capacitor and measuring a resulting high-frequency waveform on the other electrode (i.e., with an opposing polarity). The applied high-frequency low-voltage waveform is referred to herein as "sensing-voltage." The high-frequency waveform resulting on the electrode of opposed polarity is referred to herein as "sensed-waveform." In an embodiment, a sinusoidal waveform is applied and measured.

In some embodiments, a position controller controls a driver circuit, such as a high-voltage source, which generates a drive-voltage in the low KHz range, to apply the drive-voltage to an electrode of the comb-drive actuator. An electrode that receives drive-voltage is referred to herein as "second electrode." In an embodiment, the second electrode of the comb-drive actuator is electrically connected to the rotor of the comb-drive actuator. At the same time, a sensing-voltage source, such as a function generator that generates a voltage waveform at a low MHz frequency range, applies the sensing-voltage to the other electrode (i.e., to the electrode with an opposing polarity to the second electrode). An electrode that receives the sensing-voltage is referred to herein as "first electrode." In an embodiment, the first electrode of the comb-drive actuator is electrically connected to the stator of the comb-drive actuator. Alternatively, the first electrode may be connected to the stator of a comb-drive actuator while the second electrode would therefore be connected to the rotor.

In an embodiment, the resulting sensed-waveform, which is generated by the sensing-voltage, falls on a resistor connected in series between the high-voltage driver and the second electrode of the comb-drive actuator. Such a resistor is referred to herein as "sensing-resistor." The sensed-waveform comprises a high-frequency low-amplitude waveform that is amplitude-modulated slowly by the drive-voltage. As shown below, the amplitude of the sensed-waveform is proportional to the instantaneous (e.g. momentary) capacitance of the comb-drive actuator, thus providing a direct method for position measurement of the comb-drive actuator.

In an embodiment, in order to measure a sensed-waveform over the sensing-resistor, a reinforced isolated amplifier translates the differential sensed-waveform voltage from the high-voltage domain into a low-voltage domain. In the low-voltage domain, the differential sensed-waveform is measured by a sensing circuitry, such as a voltmeter and digitized by an analog-to-digital converter (ADC). Alternatively, the differential sensed-waveform is initially digitized, and then digital reading circuitry evaluates the digitized voltage value.

In some embodiments, the MEMS device incorporates multiple independent comb-drive actuators, for example to move multiple mirrors or to rotate a single gimbaled mirror about two orthogonal axes. The disclosed sensing method is used for separately measuring the different capacitances of the multiple comb-drive actuators, so as to indicate a distinct position of each comb-drive actuator.

In an embodiment, multiple independent high-voltage sources apply separate drive-voltages to multiple respective comb-drive actuators via multiple respective second electrodes, wherein each of the second electrodes is electrically isolated from the other. The first electrodes (i.e., electrodes of opposing poles) of the multiple comb-drive actuators are all electrically connected to a common first electrode. The sensing-voltage is applied to the common (i.e., first) electrode. One or more measurement circuitries independently measure multiple resulting respective sensed-waveforms over respective different sensing-resistors that are included in the one or more measurement circuitries.

The disclosed sensing circuitry and method is advantageous over possible solutions that rely on dividing the combs of an actuator into a drive section and a sense section, which results in reduced drive strength, as well as providing less accurate sensing due to reduced capacitance. The disclosed method, which separately applies the drive-voltage and the low-voltage on opposing poles of a comb-drive actuator, is advantageous when compared to applying both the high and the low voltages from the same pole, which causes distortion of the sensed-waveform and results in a less precise position measurement.

System Description

FIG. 1 is a schematic top view of a gimbaled micromirror array 20, in accordance with an embodiment of the invention. Array 20 is typically produced by etching a semiconductor wafer, such as an epitaxial silicon wafer, to define a frame 30 having a central opening which contains a mirror plate 32 comprising a mirror 22. A pair of hinges 28, such as etched torsion hinges, are connected between frame 30 and a plate 32 at locations on the central axis on opposing sides of the frame, so as to enable slow rotation of plate 32 about the x-axis relative to frame 30. Typically, a reflective coating is deposited on the wafer surface in the area of mirror 22. The reflective coating is typically omitted from other surfaces, part of which may even be coated with a light-absorbing layer, in order to reduce undesired specular reflections.

In the pictured embodiment, mirror 22 is rotationally connected to plate 32 by hinges 34, so as to enable fast rotation of mirror 22 about the y-axis relative to plate 32. Thus, plate 32 serves as a gimbal that slowly rotates relative to frame 30, about a frame axis that is perpendicular to the axis of mirror 22, while mirror 22 has a fast rotation relative to plate 32. An example of a micromirror array sharing similarities with array 20 is described in U.S. Pat. No. 9,703,096, whose disclosure is incorporated herein by reference.

Typically, plate 32 is configured to rotate about hinges 28 and hinges 34 by applying drive-voltage at a resonant frequency characteristic of plate 32. Similarly, mirror 22 is configured to rotate about plate 32 by another application of drive-voltage at a resonant frequency characteristic of mirror 22. As known in the art, there is an effort to design micromirror array 20 such that plate and mirror 22 have the same characteristic resonant frequency, which is referred to herein as the "resonant frequency" of micromirror array 20. Alternatively, plate 32 may be driven non-resonantly.

To drive the rotations of plate 32, the semiconductor wafer is etched to define interleaved comb-drive actuator 36b, including one set of combs extending outward from plate 32 and a second set of combs extending inward from frame 30 (i.e., together forming the interleaved comb-drive actuator 36b). Similarly, to drive the rotations of mirror 22, the semiconductor wafer is etched to define interleaved comb-drive actuator 36a, including one set of combs extending outward from mirror 22 and a second set of combs extending inward from plate 32.

Moving parts, such as plate 32 and mirror 22, are referred to as "rotor" in the description. A static part, such as frame 30, is referred to as "stator" in the description. Combs 36a and 36b comprise an electrically conductive material (typically deposited on the semiconductor surface), which is coupled by drive traces to an electrical drive circuit (not shown). Rotation of the rotor (e.g., of plate 32 and mirror 22) is thus driven by varying electrostatic forces between stator and rotor combs 36a and 36b (wherein plate 32 functions also as a stator for mirror 22), as is known in the art.

The driving electrical power for the fast rotation of mirror 22 is supplied to combs 36a via electrode 51a. The driving electrical power for the slow rotation of plate 32 is supplied to combs 36b via electrodes 51b. Electrodes 51a and 51b are electrically isolated from each other. The varying electrostatic forces between stator and rotor combs 36a and 36b are a result of variably charging the respective stators and rotors with electrical charges of opposite polarity. Thus, combs 36a and 36b can be electrically modeled as variable capacitors. An electrode 41 is used to connect into the electrical position-sensing circuitry of array 20, in order to measure varying capacitances of combs 36a and 36b so as to indicate their different positions, as described below.

Capacitive Position Sensing for Capacitive Drive MEMS Devices

Figure 2:
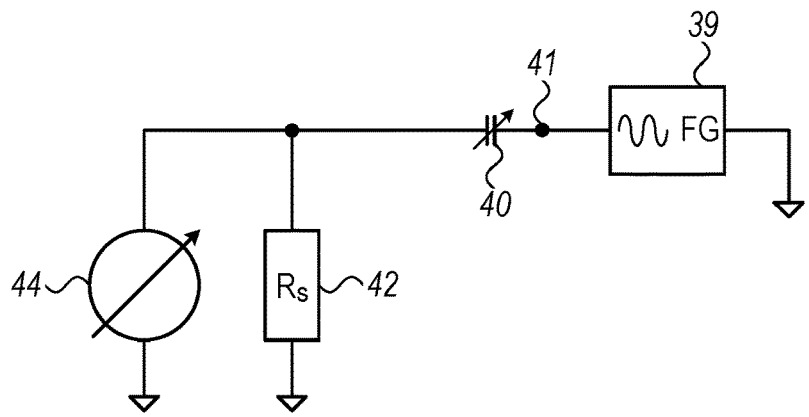
FIG. 2 is a schematic block diagram of circuitry for measuring variable capacitance, in accordance with an embodiment of the present invention.

FIG. 2 is a schematic block diagram of circuitry for measuring variable capacitance, in accordance with an embodiment of the present invention. The description of FIG. 2 serves as an introduction to the concept and principles for sensing a variable capacitance of a comb-drive actuator, upon which the disclosed embodiments are partially based.

As seen in FIG. 2, a function generator 39 applies to an electrode 41 of a capacitive link 40, i.e., to a variable capacitor 40, sensing-voltage comprising a high-frequency, $f_i$, low-voltage, $V_i(t)$, sine wave $V_i(t)=V_i \cdot \sin(2\pi f_i t)$, having an amplitude $V_i$. The high-frequency referred herein has a typical value of several MHz. A sensing circuitry, such as a voltmeter 44, reads a resulting high-frequency sensed-waveform, $V_s(t)$, which falls over a sensing-resistor 42.

Assuming that both the capacitance of variable capacitor 40, C, and the resistance of sensing-resistor 42, $R_s$, are small enough to yield $(1/R_s C) \ll f_i$, the sensing-voltage, $V_s$, that induces a current i(t) that flows in sensing-resistor 42 is provided by:

$$i(t) = C \cdot \frac{dV_i(t)}{dt}$$

For a sine wave, Eq. 1 can be solved to yield:

$$i(t) = C \cdot \frac{dV_i(t)}{dt} = C \cdot \frac{d(V_i \cdot \sin(2\pi f_i t))}{dt} = 2\pi \cdot \cos(2\pi f_i t) \cdot C \cdot f_i \cdot V_i$$

The measured peak-to-peak (i.e., double of the amplitude) of the sensed-waveform over sensing-resistor 42 is given by:

$$V_{s,PP} = I_{PP} \cdot R_s = 4\pi \cdot C \cdot f_i \cdot V_i \cdot R_s \qquad \text{Eq. 1}$$

The sense-waveform frequency ($f_i$), input voltage ($V_i$), and sensing-resistor 42 ($R_s$) can be chosen according to system requirements. The observed doubled amplitude of the sensed-waveform, ($V_{s,PP}$), is proportional to the given capacitance, C, thus providing a direct method of measurement of a variable capacitance. In an embodiment, based on the above inputs, and based on Eq. 1, a processor calculates the capacitance C of a comb-drive actuator.

The block diagram shown in FIG. 2 is chosen purely for the sake of conceptual clarity. FIG. 2 shows only parts relevant to a concept utilizing some embodiments of the present invention. Other system elements, such as drive-voltage applied to the other electrode of variable capacitor 40, are omitted, and are described below.

Figure 3:
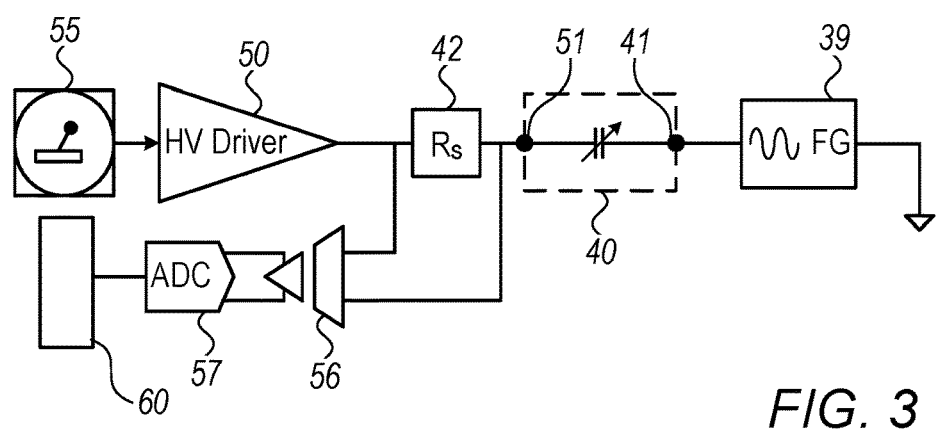
FIG. 3 is a schematic block diagram of circuitry that simultaneously drives a comb-drive actuator and senses a respective capacitance of the comb-drive actuator, in accordance with an embodiment of the present invention.

FIG. 3 is a schematic block diagram of circuitry that simultaneously drives a comb-drive actuator and senses a respective capacitance of the comb-drive actuator, in accordance with an embodiment of the present invention.

As seen in FIG. 3, function generator 39 applies sensing-voltage to a first electrode 41 of a variable capacitor 40 (electrode 41 is functionally the same as electrode 41 in FIG. 2). In parallel, in response to a command sent by a rotor position controller 55, a high-voltage source 50 applies drive-voltage to a second electrode 51 of variable capacitor 40. With reference to FIG. 1, electrode 41 may represent an electrical connection to a stator comb of plate 32, relative to which mirror 22 rotates. In the same assembly, electrode 51 represents an electrode connected to the rotor part of the comb-drive actuator of mirror 22 (i.e., electrode 51a).

A typical drive-voltage would have an amplitude of up to several tens of volts with a resonant frequency of up to several tens of kHz. Variable capacitor 40 models the variable capacitance of interleaved combs, such as of comb-drive actuators 36a and 36b, which changes as the overlap between stator comb and rotor comb changes.

In principle, the sensing-voltage and the drive-voltage can be applied from the same electrode (e.g., electrode 51). However, such a connection scheme requires coupling the drive-voltage and the low-voltage (e.g., by using AC coupler circuitry), which adds distorting and attenuating impedance. An example of a possible resulting distortion is field-time distortion of the output waveform, known in the art as "field tilt."

Nevertheless, some measure of voltage amplitude modulation occurs in the disclosed opposing polarity connection scheme, where, for example, a resulting sensed-waveform is slowly modulated by the drive-voltage. However, by applying the sensing-voltage from an opposite end of the device, the disclosed method eliminates the need for additional coupling circuitry, and thereby achieves a minimal distortion of the sensed-waveform.

In an embodiment, sensing circuitry reads the resulting sensed-waveform that falls over sensing-resistor 42. As seen in FIG. 3, one implementation to enable measuring the high-frequency sensed-waveform, which is provided on top of a drive-voltage reference, is to translate the differential sensed-waveform voltage from the high-voltage domain into a low-voltage domain using a reinforced isolated amplifier 56. The amplifier's adaptive reference ground will thus follow the drive voltage. In the low-voltage domain, the differential sensed-waveform signal is connected to the voltmeter 44 circuit and then to an analog-to-digital convertor (ADC) 57. Thus, in the present example, the sensing circuitry comprises amplifier 56 and ADC 57. Based on the digitally converted sensed-waveform, signal processing circuitry, such as a processor and/or a discrete demodulation circuit, estimates a position of the first electrode relative to the second electrode.

The block diagram shown in FIG. 3 is chosen purely for the sake of conceptual clarity. FIG. 3 shows only one possible realization of a concept that some embodiments of the present invention demonstrate. For example, in an alternative embodiment, the amplifier 56 outputs sensed-waveform voltage directly to ADC 57, and the sensed-waveform voltage is read only after being initially digitized.

Figure 4:
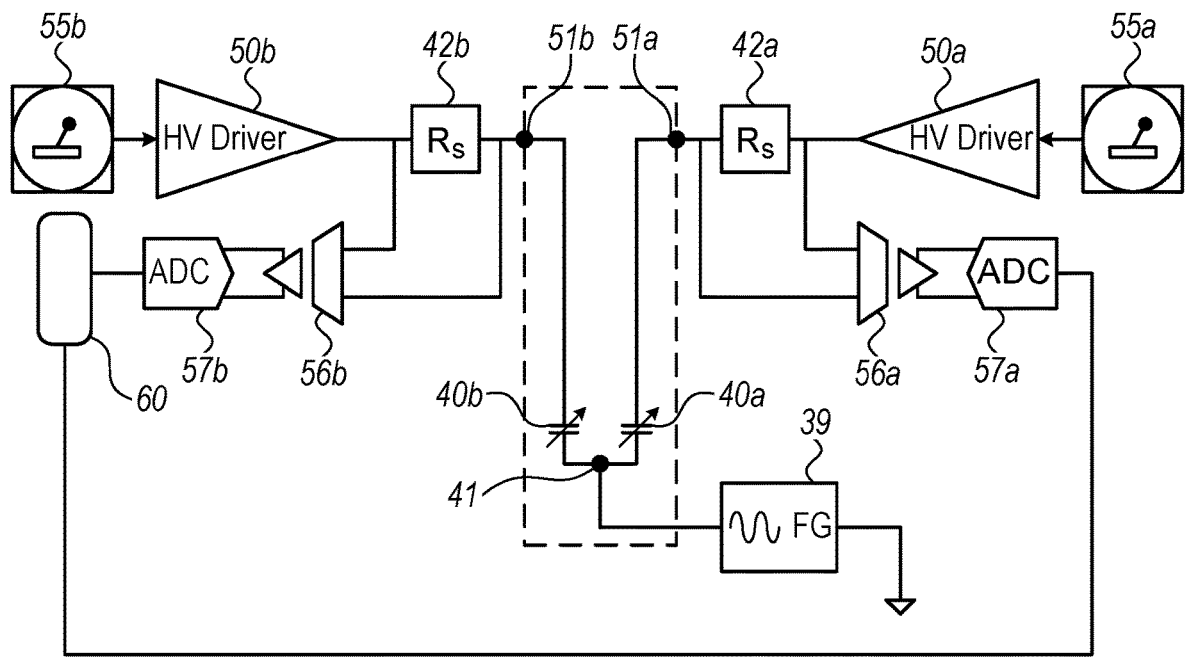
FIG. 4 is a schematic block diagram of circuitry that independently drives two comb-drive actuators and senses their respective capacitances, in accordance with an embodiment of the present invention.

FIG. 4 is a schematic block diagram of circuitry that independently drives two comb-drive actuators and senses their respective capacitances, in accordance with an embodiment of the present invention. Specifically, the block diagram shown in FIG. 4 describes circuitries for both driving and position-sensing of mirror 22 and plate 32 of gimbaled micromirror array 20 of FIG. 1.

In response to commands set by rotor position controllers 55a and 55b, high-voltage sources 50a and 50b independently apply drive-voltage to electrodes 51a and 51b of variable capacitors 40a and 40b. In an embodiment, drive-voltage sources 50a drives mirror 22 fast motion, whereas drive-voltage sources 50b drives plate 32 slow motion. In FIG. 4, electrodes 51a connect the drive-voltage to the rotor of comb-drive actuator 36a of mirror 22, while electrodes 51b connect the drive-voltage to the stator of comb-drive actuator 36b.

Function generator 39 applies the sensing-voltage to a common electrode 41 of variable capacitors 40a and 40b. In FIG. 4, electrode 41 electrically connects, in parallel, the stator of comb-drive actuator 36a and the rotor of comb-drive actuator 36b. As seen, in both actuators 36a and 36b, the sensing-voltage and the drive-voltages are applied simultaneously from opposing poles.

In an embodiment, resulting sensing-waveforms that fall over a sensing-resistors 42a and 42b serve as independent inputs of amplifiers 56a and 56b, respectively. As seen in FIG. 4, one implementation to enable sensing-voltage measurement, which is provided on top of amplifiers 56a and 56b, is to translate the respective differential sensing-waveforms from the high-voltage domain into a low-voltage domain, and then output the respective signals in the low-voltage domain to ADC 57a and ADC 57b, respectively. Based on the digitally converted sensed-waveforms, a processor 60 estimates a position of the first electrode relative to the second electrode of each of the comb-drive actuators 36a and 36b.

The block diagram shown in FIG. 4 is chosen purely for the sake of conceptual clarity. FIG. 4 shows only one possible realization of a concept that some embodiments of the present invention demonstrate. For example, the same proposed method can be extended to apply to independently driving numerous comb-drive actuators and sensing their capacitances.

Figure 5:
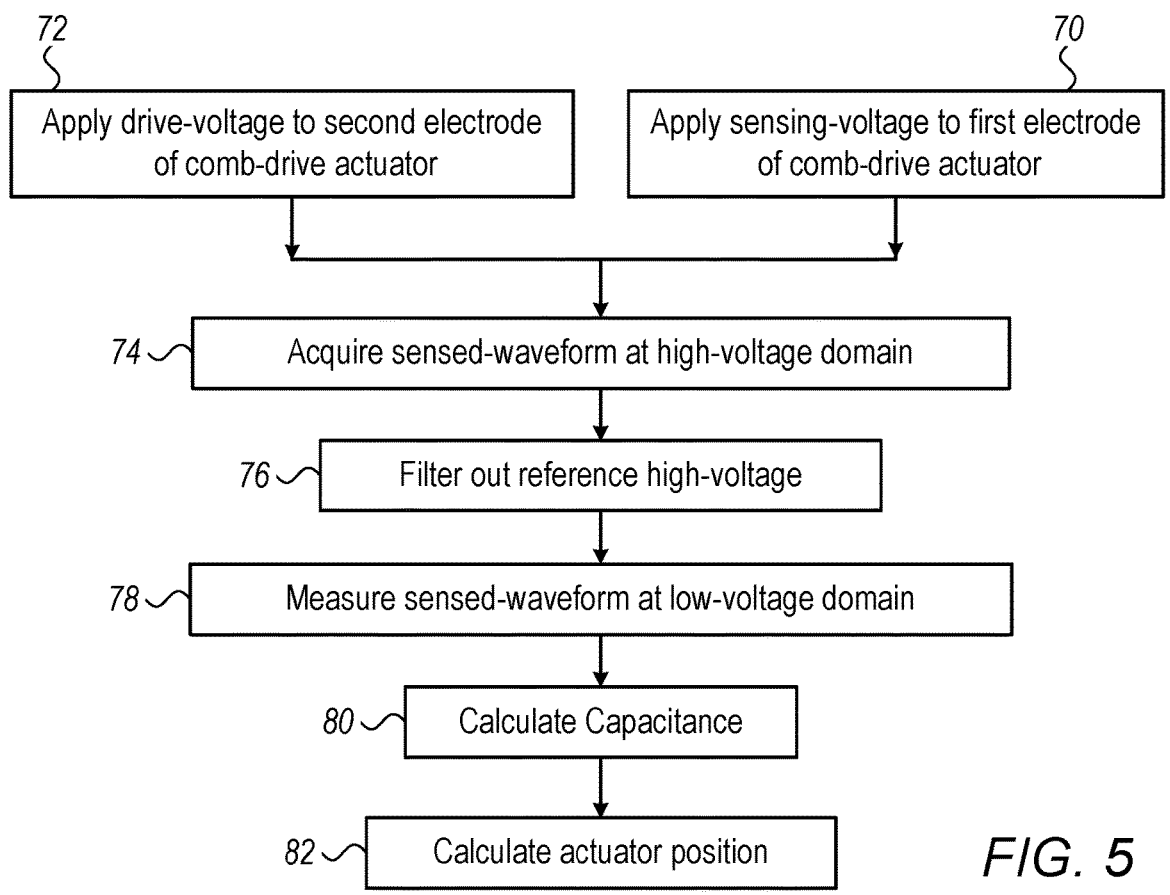
FIG. 5 is a flow chart that schematically illustrates a method for simultaneously driving a MEMS device and indicating comb-drive actuator position by sensing a capacitance of the comb-drive actuator, in accordance with an embodiment of the present invention.

FIG. 5 is a flow chart that schematically illustrates a method for simultaneously driving a MEMS device and indicating actuator position by sensing a respective capacitance, in accordance with an embodiment of the present invention. At a sensing step 70, function generator 39 applies sensing-voltage to a first electrode of a comb-drive actuator of a MEMS device. The first electrode may be connected to a stator of an actuator of a MEMS mirror. Simultaneously, at a driving step 72, position controller 55 commands a high voltage source 50 to apply drive-voltage to a second electrode of the comb-drive actuator of the MEMS device. The second electrode may be connected to the rotor of the actuator of the MEMS mirror.

Next, at a sensed-waveform acquisition step 74, amplifier 56 acquires the resulting sensed-waveform in a high-voltage domain. Amplifier 56 then filters out the reference high-voltage (i.e., the drive-voltage), at a filtration step 76. A sensing circuitry, such as voltmeter 44, measures the resulting sensed-waveform in the low-voltage domain, at a sensed-waveform measurement step 78. Using the measured sensed-waveform, a processor calculates the capacitance of the comb-drive actuator, at a capacitance calculation step 80. Finally, it processes or calculates a position of the comb-drive actuator (e.g., a corresponding MEMS mirror position), at a position calculation step 82.

The flow chart shown in FIG. 5 is chosen purely for the sake of conceptual clarity. For example, other flow charts may describe the position sensing of multiple MEMS devices, using a common time-division measurement architecture for measuring multiple different sensed-waveforms.

Although the embodiments described herein mainly address optical MEMS applications, the methods and systems described herein can also be used in other MEMS applications, such as in MEMS gyroscopes, MEMS accelerometers and MEMS actuators (e.g., in lens focusing devices).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for driving and position sensing in a comb-drive actuator, the apparatus comprising:
   a generator, configured to apply a sensing-voltage to a first electrode of the comb-drive actuator;
   a driver circuit, configured to apply a drive-voltage to a second electrode of the comb-drive actuator, having an opposite polarity relative to the first electrode;
   sensing circuitry, which is configured to measure at the second electrode a sensed-waveform resulting from the sensing-voltage applied to the first electrode; and
   signal processing circuitry, which is configured to estimate a position of the first electrode relative to the second electrode based on the sensed-waveform.

2. The apparatus according to claim 1, wherein the sensed-waveform falls on a resistor connected in series to the second electrode.

3. The apparatus according to claim 1, wherein the sensed-waveform is measured by a circuit having an adaptive reference ground.

4. The apparatus according to claim 1, wherein the sensing-voltage comprises a sine waveform.

5. The apparatus according to claim 1, wherein:
   the generator is configured to apply the sensing-voltage to a common first electrode of two or more comb-drive actuators;
   the driver circuit comprises two or more driver circuits configured to apply respective drive-voltages to two or more respective second electrodes of the two or more comb-drive actuators;
   the sensing circuitry is configured to measure at the second electrodes respective sensed-waveforms resulting from the sensing-voltage applied to the common first electrode; and
   the signal processing circuitry is configured to estimate positions of the first electrodes relative to the respective second electrodes based on the respective sensed-waveforms.

6. A method for driving and position sensing in a comb-drive actuator, the method comprising:
   applying a sensing-voltage to a first electrode of the comb-drive actuator;
   applying a drive-voltage to a second electrode of the comb-drive actuator, having an opposite polarity relative to the first electrode;
   measuring at the second electrode a sensed-waveform resulting from the sensing-voltage applied to the first electrode; and
   estimating a position of the first electrode relative to the second electrode based on the sensed-waveform.

7. The method according to claim 6, wherein measuring the sensed-waveform comprises measuring the sensed-waveform that falls on a resistor connected in series to the second electrode.

8. The method according to claim 6, wherein measuring the sensed-waveform comprises measuring the sensed-waveform using a circuit having an adaptive reference ground.

9. The method according to claim 6, wherein applying the sensing-voltage comprises applying a sine waveform.

10. The method according to claim 6, wherein:
    applying the sensing-voltage comprises applying the sensing-voltage to a common first electrode of two or more comb-drive actuators;
    applying the drive-voltage comprises applying respective drive-voltages to two or more second electrodes of two or more respective comb-drive actuators;
    measuring at the two or more second electrodes respective sensed-waveforms resulting from the sensing-voltage applied to the common first electrode; and
    estimating positions of the first electrodes relative to the respective second electrodes based on the sensed-waveforms.

* * * * *